Sept. 23, 1924.
W. E. HUDSON
1,509,207
HEATING SYSTEM
Original Filed June 7, 1921   2 Sheets-Sheet 1
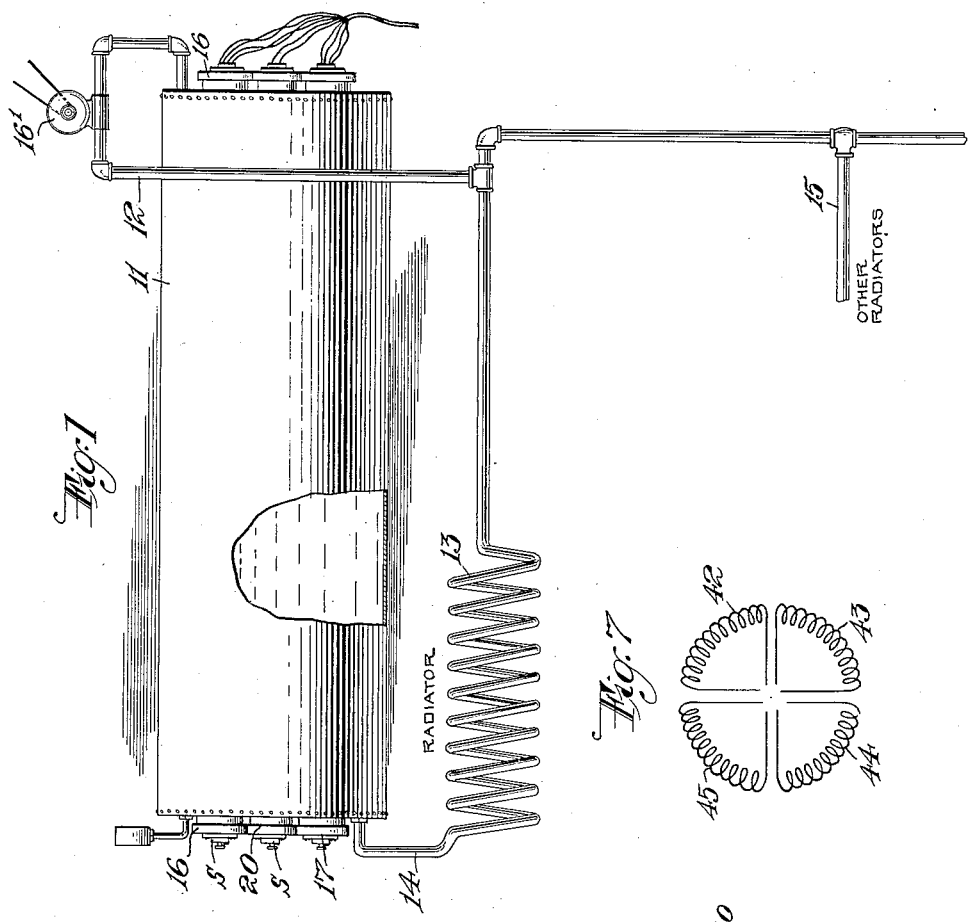
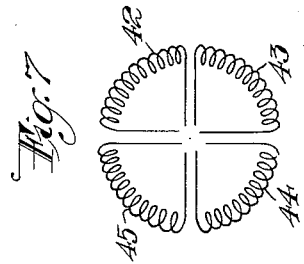
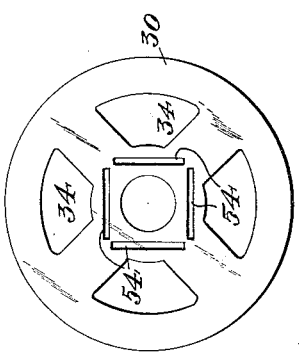
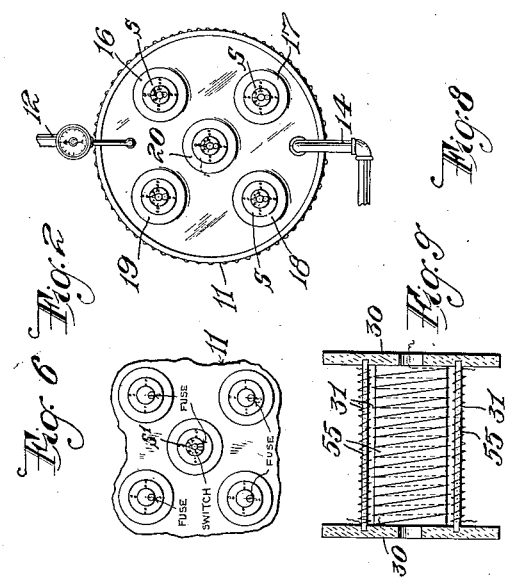
INVENTOR
WALTER E. HUDSON
BY
ATTORNEY Sept. 23, 1924.
W. E. HUDSON
HEATING SYSTEM
1,509,207
Original Filed June 7, 1921    2 Sheets-Sheet 2
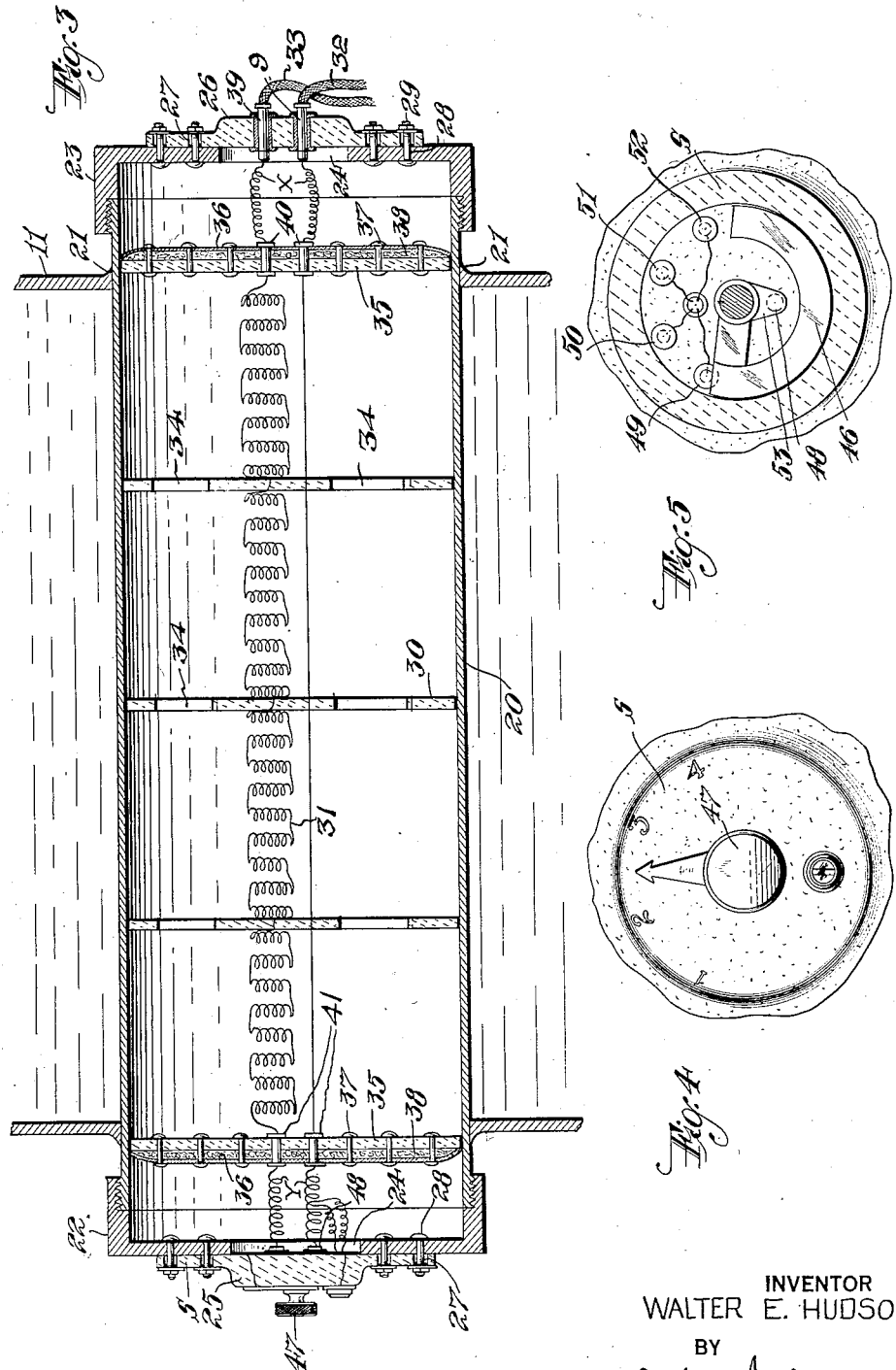
INVENTOR
WALTER E. HUDSON
BY
Arthur Middleton
ATTORNEY Patented Sept. 23, 1924.

1,509,207

UNITED STATES PATENT OFFICE.

WALTER E. HUDSON, OF AMAGANSETT, NEW YORK.

HEATING SYSTEM.

Application filed June 7, 1921, Serial No. 475,676. Renewed January 23, 1924.

*To all whom it may concern:*

Be it known that I, WALTER E. HUDSON, a citizen of the United States, residing at Amagansett, in the county of Suffolk and State of New York, have invented certain new and useful Improvements in Heating Systems, of which the following is a specification.

This invention relates to heating systems and its object is to provide a method and means for handling electricity whereby its heating energy can be used in a convenient, efficient, uniform and easily controlled manner.

The invention consists essentially of a water container having electrical means therein for heating the water and then circulating the water to heat by it any space of human dwelling or congregation such as houses, trains, cars, etc. Or, the boiler and electric heating means may be used to generate steam. The invention includes details of control of the degree of electrical heating; details of support of the heating elements whereby they are supported against vibration and breakage; details whereby upon breaking of a heating wire or ribbon it is prevented from coming into contact with and short circuiting any other wire; details of ventilating means supporting the heating elements within the boilers; and details whereby the heating elements are easily removable from the boiler.

I have herein disclosed one embodiment, with slight modifications of my invention but it is to be understood that the showing has been used in an illustrative sense only for the invention is capable of many different embodiments, all having the same underlying principles.

The invention is illustrated in the accompanying drawings in which—

Figure 1 shows a side elevation of my boiler, with a diagrammatic showing of the rest of the heating system;

Fig. 2 is an end view of the boiler;

Fig. 3 is an exaggerated vertical sectional view of the boiler;

Fig. 4 shows an elevation of the switch control of the electrical heating;

Fig. 5 shows a vertical sectional view through the switch;

Fig. 6 shows a modified switch control;

Fig. 7 shows the sectional arrangement of the heating resistance;

Fig. 8 shows an elevation of one of the resistance supporting discs; and

Fig. 9 shows a sectional view of the manner of supporting the heating resistance between the discs.

The invention may be described by beginning with a water boiler 11, the water in which is heated electrically instead of by fire. The boiler 11 is part of a heating or water circulating system which involves an outlet pipe 12, leading from the top of the boiler to a radiator 13 and the water passes back to the bottom of the boiler by pipe 14. Obviously, this system could be extended as at 15 to include other radiators. Where the system is installed in awkward places, I may use a pump 16 to facilitate the circulation of the water in the system.

The means for heating the water in the boiler are electrical and constitute one or more tubes 16, 17, 18, 19 and 20 extending through the boiler 11 and having the joints 21 where the tubes emerge from the boiler made tight by welding or other process. Each tube such as 20 is provided with threaded metal end caps 22 and 23 apertured at 24 and these caps are adapted to carry closures 25 and 26 respectively of porcelain or other suitable insulating material. That expansion between the caps and their closures may be provided for, the closures 25 and 26 are equipped with radial slots, such as 27 through which bolts from the cap, such as 28, extend and are finished off with nuts 29 for clamping the closures to the caps.

Within the tube 20 are provided discs such as 30 of porcelain or other insulating material for supporting electrical heating element 31 connected to a source of current by wires 32 and 33.

These discs are preferably formed with apertures 34 therethrough for the purpose of ventilation and these discs are of such a diameter that they fit loosely in the tube 20. End discs 35 are provided in the tube to prevent the escape of heat from that part of the tube within the boiler and surrounded by water to that part or parts of the tube extending beyond the boiler.

These discs 35 have an outer plate 36 riveted as at 37, or otherwise fastened, to the discs 35 with asbestos 38 between the disc and plate. If heat tended to escape past this, then further asbestos bearing plates or discs could be used. The electric wires 32 and 33 are adapted to slide freely through closure 26 and discs 35, and the ferrules 39, 40 and 41 therein respectively.

On closure 25, I provide a switch S for controlling the heating and extent of heating of the resistance 31 for the resistance is wound in sections 42, 43, 44 and 45 (Fig. 7) and each point of the switch controls the passage of current through one section of the resistance. This is done by having a segment arm 46 on the switch handle 47 long enough to progressively contact with terminals 49, 50, 51 and 52, respectively connected to the different sections 42, 43, 44 and 45 of the heating resistance. The return of the current is through the terminal 48 and the arm 53 of the switch. A fuse F is in the electric circuit so by it, or other visual means, the operative, inoperative or injured condition of the heating resistance can be seen at a glance.

In some instances it will be desirable to have a heating control switch for each tube as shown in Fig. 2 and in others, switch S' will be used to control all the tubes and this switch may be on the boiler or distant from it as desired.

That the heating resistance may be proof against vibration where such would be encountered in car heating, I may provide the discs with grooves 54 into which and between adjacent discs, there can be supported plates 55 of mica or other insulating material, around which can be wrapped, (and thereby thoroughly supported) the heating wire or ribbon 31. In the event of extreme vibration where even so supported, breakage of the resistance is apt to result, only certain of the plates 55, such as alternate ones, can be provided with the resistance. With such an arrangement where breakage of a resistance ribbon took place, the loose end thereof would, of course, fall and touch or rest upon the adjacent plate 55 but as it has no resistance wire on it, and it lies between the broken resistance and the next plate having resistance thereon, no short circuit can result.

In the event, however, of injury to the electrical resistance, the interior mechanism can easily be removed from the tube by removing the closure 26 and sliding it along the wires 32 and 33 away from the cap 23. Next the cap 23 is unscrewed. In the same manner the closure 25 is removed from cap 22 and then cap 22 unscrewed, whereupon the wires 32 and 33 are severed or disconnected at either X or Y and the discs and their resistances removed or slid more or less as a unit from either end of the tube depending upon whether the wires are severed at X or Y. To install the mechanism, these steps are reversed.

What I claim is:
1. In a heating system, a boiler, a tube passing therethrough, a heating element in said tube, and ventilating insulated means for supporting the element within the tube.

2. The apparatus of claim 1 in which the insulated supporting means are apertured.

3. In a heating system, a boiler, a tube passing therethrough and having parts thereof extending beyond the boiler, a heating element in said tube, supporting means for said element adjacent each end of said tube, a cap on each end of said tube, and means for insulating against heating the chamber formed between said caps and the adjacent supporting means.

4. The apparatus of claim 3 in which the insulating means include asbestos secured to the outer face of said supporting means.

5. The apparatus of claim 3 in which the insulating means include asbestos on the outer face of said supporting means, and a plate holding the asbestos in place on the supporting means.

6. In a heating system, a boiler, a tube passing therethrough, a heating element in said tube, supporting means for said element, a metal cap on each end of said cap, electrical connections for said heating element passing through said caps and an earthen closure for said caps encircling said electrical connections.

7. The apparatus of claim 6 with means permitting relative expansion between the cap and closure.

8. The apparatus of claim 6 with a control for said electrical connections enclosed in one of said closures.

9. In a heating system, a boiler, tubes passing therethrough, a heating element in each tube, and visual means for indicating the condition of the heating element in each tube.

10. In a heating system, a boiler, a tube passing therethrough, a plurality of electrical resistances in said tube, and supporting means for said resistances adapted to prevent the resistance when broken from coming into contact with each other.

11. In a heating system, a boiler, a tube passing therethrough, a plurality of resistance supporting discs in said tube, an insulating strip extending between adjacent discs, and electrical resistance carried by said strip.

12. The apparatus of claim 11 with the addition of a plurality of said strips between adjacent discs and electrical resistance carried by certain of said strips.

13. The apparatus of claim 11 with the addition of recesses in said discs into which the ends of said strip is adapted to fit.

In testimony whereof I affix my signature.

WALTER E. HUDSON.